United States Patent
Ogawa et al.

(10) Patent No.: US 7,967,318 B2
(45) Date of Patent: Jun. 28, 2011

(54) STAND DEVICE FOR MOTORCYCLE

(75) Inventors: Masao Ogawa, Saitama (JP); Masahiro Akiba, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 12/975,212

(22) Filed: Dec. 21, 2010

(65) Prior Publication Data

US 2011/0089663 A1    Apr. 21, 2011

Related U.S. Application Data

(62) Division of application No. 11/710,945, filed on Feb. 27, 2007, now Pat. No. 7,857,340.

(30) Foreign Application Priority Data

Feb. 28, 2006  (JP) ................ 2006-053674
Feb. 28, 2006  (JP) ................ 2006-053675
Feb. 28, 2006  (JP) ................ 2006-053676

(51) Int. Cl.
*B62H 1/02* (2006.01)
(52) U.S. Cl. ........................ 280/301
(58) Field of Classification Search .......... 280/293, 280/301, 302, 303
See application file for complete search history.

(56) References Cited

U.S. PATENT DOCUMENTS

| 4,651,845 | A | * | 3/1987 | Yagasaki | 180/219 |
|---|---|---|---|---|---|
| 5,114,167 | A | * | 5/1992 | Shieh | 280/297 |
| 5,819,868 | A | * | 10/1998 | Koike et al. | 180/220 |
| 7,303,204 | B2 | | 12/2007 | Takahashi | |
| 2009/0212532 | A1 | * | 8/2009 | Kudo | 280/301 |

FOREIGN PATENT DOCUMENTS

| JP | 59-21828 A | 2/1984 |
|---|---|---|
| JP | 60-60079 A | 4/1985 |
| JP | 02014985 A | 1/1990 |
| JP | H5-34409 A | 2/1993 |
| JP | 8-40327 A | 2/1996 |
| JP | 2005-239016 A | 9/2005 |

* cited by examiner

*Primary Examiner* — Kevin Hurley
(74) *Attorney, Agent, or Firm* — Birch, Stewart, Kolasch & Birch, LLP

(57) ABSTRACT

A stand device for a motorcycle includes an interlocking mechanism having a coil-formed stand spring connected to a stand at one end thereof. A spring support member has a spring support portion connected with the other end of the stand spring and is interlocked and connected to an operating element so that the position of the spring support portion can be changed according to a manual operation of an operating element. The position of the spring support portion determined according to the operation of the operating element toward the erect position side is so set that the stand spring is put in the state of urging the stand toward the erect position side.

6 Claims, 14 Drawing Sheets

STAND DEVICE FOR MOTORCYCLE

CROSS-REFERENCE TO RELATED APPLICATIONS

This application is a Divisional of application Ser. No. 11/710,945 filed on Feb. 27, 2007 now U.S. Pat. No. 7,857,340, which claims priority to Application Nos. 2006-053674, 2006-053675 and 2006-053676, each filed in Japan on Feb. 28, 2006. The entire contents of all of the above applications are hereby incorporated by reference.

FIELD OF THE INVENTION

A first aspect of the present invention relates to a stand device for a motorcycle, including an operating element capable of being manually operated, a stand turnable between an erect position for obtaining a parking condition and a stored position for canceling the parking condition, and an interlocking mechanism by which the stand is turned from the stored position to the erect position according to a manual operation of the operating element.

A second aspect of the present invention relates to a stand device for a motorcycle in which a stand shaft attached to a stand is borne on a vehicle body frame or a support body fixed to the vehicle body frame, in such a manner that the stand can be turned between an erect position for obtaining a parking condition and a stored position for canceling the parking condition.

A third aspect of the present invention relates to a stand device for a motorcycle, including an operating element capable of being manually operated, a stand turnable between an erect position for obtaining a parking condition and a stored position for canceling the parking condition, and an interlocking mechanism by which the stand is turned from the stored position to the erect position according to a manual operation of the operating element.

BACKGROUND OF THE INVENTION

A stand for a motorcycle is know, wherein a link is provided between a stand turnably borne by a bracket attached to a vehicle body frame and the bracket. A tension spring separate from a stand spring is provided between a wire pulled according to a manual operation of an operating element and the stand. (For example, see Japanese Patent Laid-open No. 2005-239016).

However, in the device disclosed in Japanese Patent Laid-open No. 2005-239016, at the time of turning the stand to the erect position, the wire must be pulled against the spring force of the tension spring. In addition, the spring load on the tension spring is set to be larger than the force necessary for erecting the stand, namely, the spring load on the stand spring. Therefore, the operating load on the operating element for turning the stand to the erect position is necessarily large. On the other hand, it may be contemplated to connect the wire continuous with the operating element to the stand directly. In this case, however, a larger operating force is necessary if the wire is connected to a position close to a turning shaft of the stand. Therefore, it is preferable to connect the wire to a position far from the turning shaft of the stand. However, there is a limitation on the layout, and it is difficult to design the preferred configuration.

A stand device for a motorcycle is know, wherein a ratchet mechanism, composed of a fan-shaped pawl portion and a restricting pawl, is provided for preventing a stand being in an erect position from being erroneously turned toward a stored position side (For example, see Japanese Patent Laid-open No. Hei 8-40327).

However, in the stand device disclosed in Japanese Patent Laid-open No. Hei 8-40327, the ratchet mechanism is a stepwise anti-rotation mechanism according to the size of the pawl, so that the anti-rotation function may fail to be displayed sufficiently against a minute turning. On the other hand, when the pawl is reduced in size, a lowering in strength may be brought about. In order to increase the strength, it is necessary to use a high-strength material or to subject a material to a hardening treatment, leading to an increase in cost.

A motorcycle is known, wherein a brake mechanism is interlocked with turning of a stand from a stored position to an erect position according to a manual operation of an operating element and a rear wheel is braked when the stand is erected by operating the operating element (For example, see Japanese Patent Publication No. Sho 59-21828).

However, in the motorcycle disclosed in Japanese Patent Publication No. Sho 59-21828, an error would be generated between an erecting operation of the stand and a brake operation due to a decrease in a play amount in the brake mechanism or the thickness of a brake pad, resulting in that the operabilities of these operations may be mutually influenced. Therefore, maintenance with a higher accuracy is demanded, or it is necessary to enhance the frequency of maintenance.

SUMMARY OF THE INVENTION

The first aspect of the present invention has been made in consideration of the above-mentioned circumstances. Accordingly, it is an object of the first aspect of the present invention to provide a stand device for a motorcycle wherein the load for a turning operation of a stand is suppressed to a low level.

In order to attain the above object, the first aspect of the invention is directed to a stand device for a motorcycle, including: an operating element capable of being manually operated; a stand turnable between an erect position for obtaining a parking condition and a stored position for canceling the parking condition; and an interlocking mechanism that turns the stand from the stored position to the erect position according to a manual operation of the operating element, wherein the interlocking mechanism has a coil-formed stand spring connected at its one end to the stand, and a spring support member having a spring support portion, to which the other end of the stand spring is connected, and being interlocked and connected to the operating element so as to permit the position of the spring support portion to be changed according to the operation of the operating element, and the position of the spring support portion determined according to the operation of the operating element to the erect position side is so set as to put the stand spring into the state of urging the stand toward the erect position side.

In addition, according to the first aspect of the present invention, the stand is turnably borne by a support body attached to a vehicle body frame, and the other end portion of the spring support member provided with the spring support portion on one end side is borne by the support body so as to be turnable about an axis parallel to the axis of turning of the stand.

In addition, according to the first aspect of the present invention, the interlocking mechanism includes an erecting operating force transmitting mechanism by which a manual operating force for operating the operating element toward a side for turning the stand from the stored position to the erect position side is transmitted to the spring support member side, and a storing operating force transmitting mechanism by which a manual operating force for operating the operating element toward a side for turning the stand from the erect position to the stored position side is transmitted to the spring support member side; and the position of the spring support portion determined according to an operation of the operating element to the stored position side is so set as to put the stand spring into the state of urging the stand toward the stored position side.

In addition, according to the first aspect of the present invention, the interlocking mechanism includes a turning lever turned about an axis parallel to the axis of turning of the spring operating member according to a manual operation of the operating element; and a transmission mechanism for transmitting a turning force of the turning lever to the spring support member is provided between the other end portion of the spring support member and the turning lever.

In addition, according to the first aspect of the present invention, a shock absorber is provided between the stand and a vehicle body frame.

In addition, according to the first aspect of the present invention, an auxiliary urging mechanism designed for changeover between a state of urging the stand toward the erect position side and a state of urging the stand toward the stored position side is provided between the stand and the support body, separately from the stand spring.

In addition, according to the first aspect of the present invention, the center of a turning shaft of the spring support member is disposed in a region surrounded by a locus along which the point of connection of the one end of the stand spring to the stand is moved according to turning of the stand, a straight line connecting the point of connection of the one end of the stand spring to the stand with the spring support portion at the time when the stand is in its stored position, and a straight line connecting the point of connection of the one end of the stand spring to the stand with the spring support portion at the time when the stand is in its erect position.

Incidentally, the support case 70 in the embodiment described later corresponds to the support body in the present invention, the operating lever 76 in the embodiment corresponds to the operating element in the invention, the second connecting pin 87 in the embodiment corresponds to the spring support portion in the invention, and the auxiliary coil spring 150 in the embodiment corresponds to the auxiliary urging mechanism in the invention.

According to the first aspect of the present invention, the other end of the stand spring connected to at its one end to the stand is connected to the spring support portion of the spring support member, the spring support member is interlocked and connected to the operating element so as to permit the position of the spring support portion to be changed according to a manual operation of the operating element, and, at the position of the spring support portion determined to an operation of the operating element to the erect position side, the stand spring is in the state of urging the stand toward the erect position side. Therefore, the stand can be turned from the stored position to the erect position by utilizing the spring force of the stand spring, and only a small operating force is needed for operating the spring support member so as to change the position of the spring support portion. As a result, it is possible to turn the stand to the erect position side while suppressing the operating load to a low level.

According to the first aspect of the present invention, the erecting operating force transmitting mechanism by which a manual operating force for operating the operating element toward the side for turning the stand from the stored position to the erect position side is transmitted to the spring support member side, and the storing operating force transmitting mechanism by which a manual operating force for operating the operating element toward the side for turning the stand from the erect position to the stored position side is transmitted to the spring support member side, are added. With this simple configuration, the stand can be turned from the stored position to the erect position side, and from the erect position to the stored position side, according to the manual operation of the operating element, while suppressing the operating load to a low level.

According first aspect of the present invention, it is possible to enhance the degree of freedom in laying out the turning lever constituting a part of an interlocking mechanism. When the transmission mechanism provided between the other end portion of the spring support member and the turning lever is provided with an accelerating or decelerating function, the operation adjustment width of the stand is enhanced, and the degree of freedom in design can be enhanced.

According to the first aspect of the present invention, the stand-turning operation by the stand spring can be made to proceed gradually, and a reduction of noise can be contrived.

According to the first aspect of the present invention, the stand is urged not only by the stand spring but also by the auxiliary urging mechanism, whereby it is possible to further reduce the operating load, while securing a sufficient urging force for turning the stand.

According to the first aspect of the present invention, a time difference can be set between the time when the operation of the operating element is completed and the time when the turning of the stand is started, whereby it is ensured that the stand will not be turned unless the condition where the operation of the operating element is completed has been maintained for a period corresponding to the time difference. Therefore, the operator's will to operate can be reflected better, and the stand can be restrained from turning against the operator's will.

The second aspect of the present invention has been made in consideration of the above circumstances. Accordingly, it is an object of the second aspect of the present invention to provide a stand device for a motorcycle wherein a stand being in an erect position can be securely prevented from being turned toward a stored position, while obviating a rise in cost.

In order to attain the above object, the second aspect of the present invention is directed to a stand device for a motorcycle, including a stand shaft attached to a stand, the stand shaft being borne on a vehicle body frame or a support body fixed to the vehicle body frame, in such a manner that the stand can be turned between an erect position for obtaining a parking condition and a stored position for canceling the parking condition, the stand device further includes a one-way clutch having an outer ring and mounted to the stand shaft, and a clutch operation control mechanism capable of inhibiting rotation of the outer ring in the condition where the stand is in the erect position, wherein the one-way clutch is mounted to the stand shaft in such a manner that in the condition where the stand is in the erect position, rotation of the outer ring is inhibited by the clutch operation control mechanism, turning of the stand toward the stored position side is inhibited.

In addition, according to the second aspect of the present invention, the clutch operation control mechanism includes a plurality of lock tooth portions provided at regular intervals at the outer circumference of the outer ring, and an engaging pawl capable of operating between a position for selective engagement with one of the lock tooth portion and a position for disengagement.

In addition, according to the second aspect of the present invention, the stand device further includes an operating element manually operated, and an interlocking mechanism that turns the stand according to an operation of the operating element.

In addition, according to the second aspect of the present invention, an operating member constituting a part of the interlocking mechanism is connected to the engaging pawl through a lost motion mechanism.

Incidentally, the support case 70 in the embodiment described later corresponds to the support body in the present invention, the operating lever 76 in the embodiment corresponds to the operating element in the invention, and the second turning shaft 95 in the embodiment corresponds to the operating member in the invention.

According to the second aspect of the present invention, with the simple configuration in which the one-way clutch and the clutch operation control mechanism are used, the stand turned to the erect position side can be steplessly prevented from being turned toward the stored position side. In addition, an assured anti-rotation effect can be obtained. Therefore, an assured parking condition can be maintained, without being affected by variations in the air pressure in wheels due to the rider's riding-on or getting-off action. Since a general one-way clutch is used, without using any special component part, a rise in cost can be suppressed.

In addition, according to the second aspect of the present invention, the clutch operation control mechanism can be configured in a simple structure.

In addition, according to the second aspect of the present invention, although it is difficult to grasp the position of the stand at the time of manually operating the operating element, the use of the one-way clutch capable of steplessly restricting the turning of the stand toward the stored position side makes it possible to enhance the assuredness of the turning operation of the stand.

In addition, according to the second aspect of the present invention, the operation of the operating element for turning the stand would not be influenced by the operation of the engaging pawl, and both the stand-turning operation and the operation of the engaging pawl can be performed assuredly.

The third aspect of the present invention has been made in consideration of the above circumstances. Accordingly, it is an object of the third aspect of the present invention to provide a stand device for a motorcycle in which an error is not liable to be generated in the interlocking between turning for erecting of a stand and inhibition of rotation of a rear wheel and of which maintenance is easy to carry out.

In order to attain the above object, the third aspect of the present invention is directed to a stand device for a motorcycle, including an operating element capable of being manually operated, a stand turnable between an erect position for obtaining a parking condition and a stored position for canceling the parking condition, and an interlocking mechanism that turns the stand from the stored position to the erect position according to a manual operation of the operating element, wherein the stand device further includes a rear wheel lock mechanism including a rotating member interlocked and connected to a rear wheel, and an engaging member capable of being changed over between a lock condition for being engaged with the rotating member to inhibit rotation of the rear wheel and an unlock condition for being disengaged from the rotating member, and the engaging member is interlocked and connected to an operating member constituting a part of the interlocking mechanism.

In addition, according to the third aspect of the present invention, a lost motion mechanism is interposed between the operating member and the engaging member.

In addition, according to the third aspect of the present invention, a kick start disabling mechanism interlocked with the rear wheel lock mechanism is provided in such a manner that the starting of an engine mounted on a vehicle body frame by a kick starter annexed to the engine is disabled in the unlock condition of the rear wheel lock mechanism.

In addition, according to the third aspect of the present invention, the kick starter includes a connecting member moved in the direction of a crankshaft of the engine so as to be engaged with the crankshaft at the time of kick starting, and the kick start disabling mechanism includes an engaging lever member capable of disabling movement of the connecting member by being engaged with the connecting member.

In addition, according to the third aspect of the present invention, the rear wheel lock mechanism is contained in a transmission case possessed by a power unit swingably borne on the vehicle body frame.

Incidentally, the operating lever 76 in the embodiment described below corresponds to the operating element in the present invention, and the second turning lever 92 in the embodiment corresponds to the operating member in the invention.

According to the third aspect of the present invention, the rotation of the rotating member interlocked and connected to the rear wheel is inhibited in conjunction with the turning of the stand toward the erect position side which turning is interlocked with the operation of the operating element. Therefore, the rotation of the rear wheel is inhibited when the stand is put in the erect position and the motorcycle is put in the parking condition, the motorcycle can be prevented from starting to run undesiredly when the stand is erected. As compared with a configuration in related art in which a brake mechanism is operated in conjunction with the turning of the stand, there is no possibility of an error being generated between an erecting operation of the stand and a brake operation due to a reduction in a play amount in the brake mechanism or the thickness of a brake pad; thus, the operabilities of these operations are not mutually affected, so that maintenance is easy to carry out.

In addition, according to the third aspect of the present invention, the operation of the operating element for turning the stand is not influenced by the operation of the engaging member, so that both the turning operation of the stand and the operation of the engaging member can be performed assuredly.

According to the third aspect of the present invention, the kick starting of the engine is permitted only in the condition where rotation of the rear wheel is inhibited by the rear wheel lock mechanism. Therefore, the motorcycle would not be moved at the time of kick starting, and operability in the kick starting is enhanced.

According to the third aspect of the present invention, the kick-start disabling mechanism has the simple structure in which the engaging member is only engaged with the connecting member of the kick-starter, so that a compact configuration can be realized.

Furthermore, according to the third aspect of the present invention the rear wheel lock mechanism is contained in the transmission case, so that the power unit inclusive of the rear wheel lock mechanism can be configured in a compact form.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
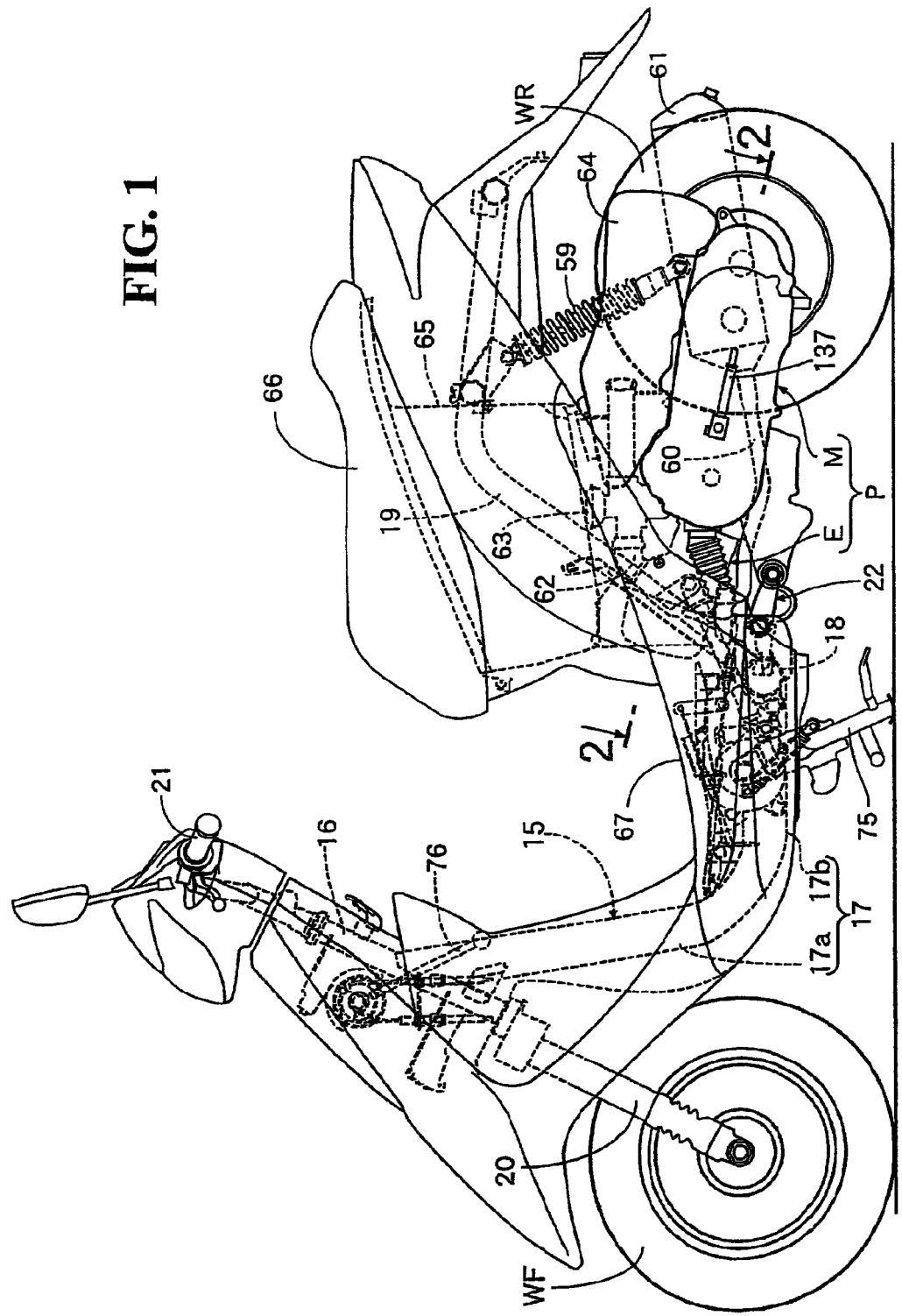
FIG. 1 is a side view of a motor scooter type motorcycle according to a first embodiment of the present invention.

The present invention will now be described in detail with reference to the accompanying drawings, wherein the same reference numerals will be used to identify the same or similar elements throughout the several views.

FIGS. 1 to 11 show a first embodiment of the present invention. First, in FIG. 1, a vehicle body frame 15 of the motor scooter type motorcycle includes a main frame pipe 17 with a head pipe 16 attached to the front end thereof. A cross pipe 18 is rectangularly attached to the rear end of the main frame pipe 17. A left-right pair of rear frame pipes 19 are connected at their front ends, respectively, to both end portions of the cross pipe 18.

The main frame pipe 17 integrally has a down frame portion 17a inclined rearwardly downwards from the head pipe 16. A lower frame portion 17b extends substantially horizontally rearwards from the rear end of the down frame portion 17a. The cross pipe 18 extends in the left-right direction of the vehicle body frame 15. A central portion in the axial direction of the cross pipe 18 is rectangularly attached to a rear end portion of the main frame pipe 17.

A front fork 20 formed astride a front wheel WF is steerably borne on the head pipe 16. A steering handle 21 is connected to the upper end of the front fork 20.

A power unit P composed of an engine E disposed on the front side of a rear wheel WR and a transmission (mission) device M disposed on the left side of the rear wheel WR is vertically swingably borne on front portions of both the rear frame pipes 19 of the vehicle body frame 15 through a link 22 so as to be vertically swingable. The rear wheel WR is rotatably supported on a rear portion of the power unit P.

Figure 2:
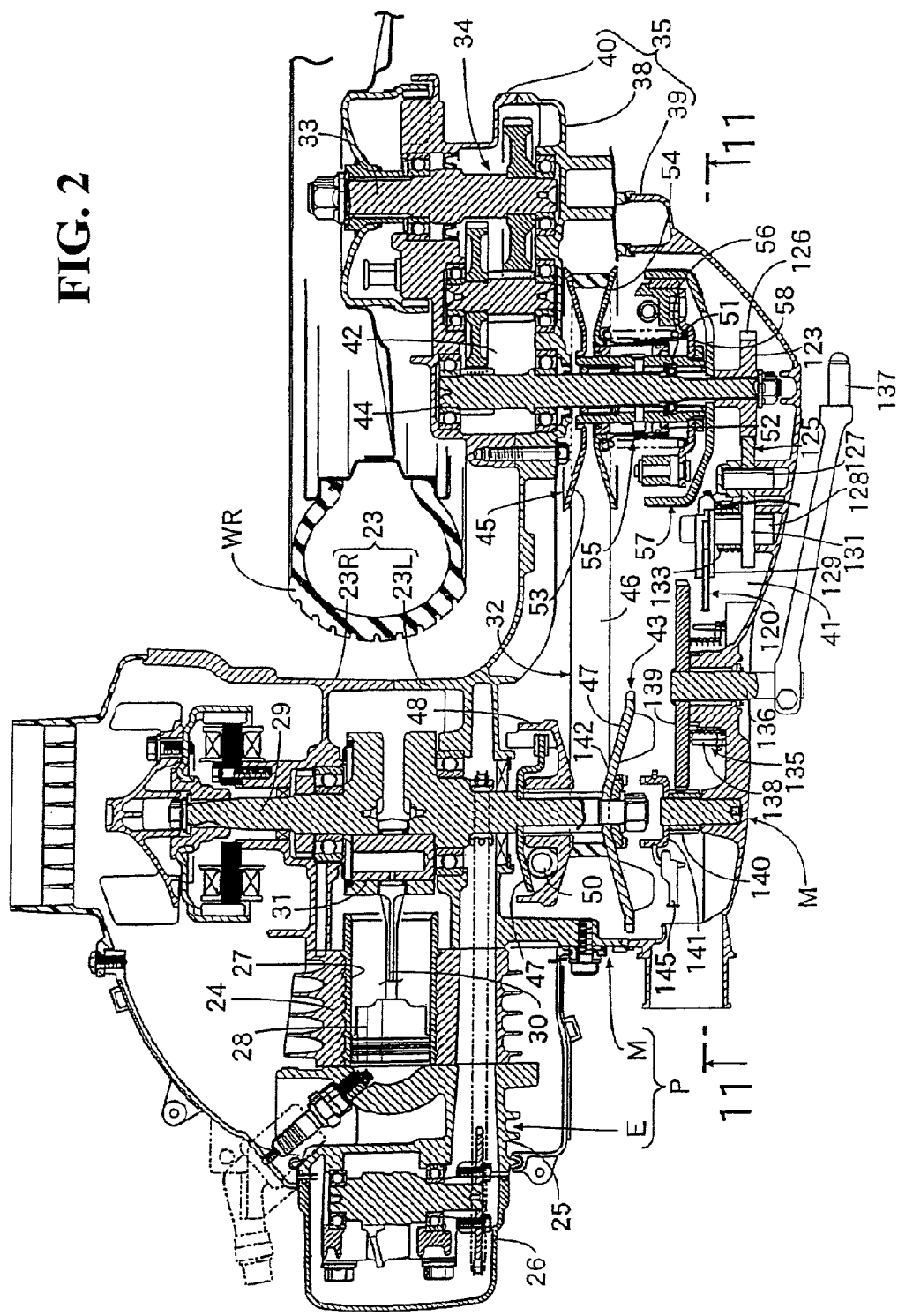
FIG. 2 is a sectional view of a power unit, taken along line 2-2 of FIG. 1.

In FIG. 2, the engine E, which is a single-cylinder air-cooled 4-cycle engine, includes a crankcase 23 composed of left and right crankcase halves 23L and 23R bisected into left and right portions and coupled to each other. A cylinder block 24 is connected to the crankcase 23. A cylinder head 25 is connected to the cylinder block 24. A head cover 26 is connected to the cylinder head 25. A piston 28 is slidably fitted in a cylinder bore 27 provided in the cylinder block 24 in the state of being slightly inclined forwardly upwards. A crankshaft 29, extending in the axial direction of the vehicle body frame 15, is rotatably borne on the crankcase 23. The piston 28 is connected to the crankshaft 29 through a connecting rod 30 and a crank pin 31.

The transmission device M is composed of a V-belt type non-stage transmission (mission) 32, and a speed reduction gear train 34 for transmitting the output of the non-stage transmission 32 to an axle 33 of the rear wheel WR through speed reduction, and is contained in a transmission case 35 connected to the crankcase 23 and extending to the left side of the rear wheel WR.

The transmission case 35 is composed of an inside case 38 integrally connected to the left crankcase half 23L of the crankcase 23 and extending rearwards, an outside case 39 covering the inside case 38 from the outside, and a gear case 40 connected to a rear portion of the inside case 38. A transmission chamber 41 for containing the non-stage transmission 32 therein is formed between the inside and outside cases 38 and 39, and a gear chamber 42 for containing the speed reduction gear train 34 therein is formed between the inside case 38 and the gear case 40.

The non-stage transmission 32 is composed of a drive pulley 43 mounted to an end portion of the crankshaft 29 projecting from the crankcase 23 into the transmission chamber 41. A driven pulley 45 is mounted to an output shaft 44 having an axis parallel to the crankshaft 29 and rotatably borne on the inside case 38 and the gear case 40. A loop form V-belt 46 transmits power from the drive pulley 43 to the driven pulley 45.

The drive pulley 43 includes a fixed pulley half 47 fixed to the crankshaft 29. A movable pulley half 48 is capable of being brought closer to and away from the fixed pulley half 47. The movable pulley half 48 is driven in the axial direction by a centrifugal force acting on a weight 50 disposed between a ramp plate 49 fixed to the crankshaft 29 and the movable pulley half 48.

In addition, the driven pulley 45 includes an inner tube 51 coaxially surrounding the output shaft 44 while permitting relative rotation. An outer tube 52 slidably fits the inner tube 51 therein while permitting relative turning about the axis and relative movement in the axial direction. A fixed pulley half 53 is fixed to the inner tube 51. A movable pulley half 54 is fixed to the outer tube 52 while facing to the fixed pulley half 53. A torque cam mechanism 55 is provided between the inner tube 51 and the outer tube 52 so as to exert an axial-direction component force between the pulley halves 53 and 54 according to a relative rotation phase difference between the movable pulley half 54 and the fixed pulley half 53. A coil spring 56 springily urges the movable pulley half 54 toward the fixed pulley half 53 side. The V-belt 46 is wrapped between the fixed pulley half 53 and the movable pulley half 54.

A centrifugal clutch 57 that is put into a power-transmitting state attendant on an increase in the engine speed beyond a preset speed is provided between the inner tube 51 of the driven pulley 45 and the output shaft 44. A coil spring 56 surrounding the outer tube 52 is disposed in a contracted state between a drive plate 58 the movable pulley half 54. The drive plate 58 constitutes a part of the centrifugal clutch 57 and is connected to the inner tube 51 coaxially and so as not to be rotatable relative to the inner tube 51, The spacing between the fixed pulley half 53 and the movable pulley half 54 in the driven pulley 45 is determined by the axial force generated by the torque cam mechanism 55, an axial elastic force generated by the coil spring 56, and a force supplied from the V-belt 46 and acting so as to enlarge the spacing between the fixed pulley half 53 and the movable pulley half 54. When the movable pulley half 48 is brought closer to the fixed pulley half 47 in the drive pulley 43 and the radius of wrapping of the V-belt 46 around the drive pulley 43 is thereby increased, the radius of wrapping of the V-belt 46 around the driven pulley 45 is decreased.

The axle 33 of the rear wheel WR is rotatably borne on the inside case 38 and the gear case 40. The speed reduction gear train 34 provided between the output shaft 44 and the axle 33 is contained in the gear chamber 42.

Again in FIG. 1, a rear cushion unit 59 is provided between a rear portion of the transmission case 35 in the power unit P and the left-side rear frame pipe 19 of the left-right pair of the rear frame pipes 19. In addition, an exhaust pipe 60 for guiding an exhaust gas from a lower portion of the cylinder head 25 in the engine E is extended from the engine E to the right side of the rear wheel WR. The exhaust pipe 60 is connected to an exhaust muffler 61 disposed on the right side of the rear wheel WR.

A carburetor 63 is connected to an upper portion of the cylinder head 25 in the engine E through an intake pipe 62. The carburetor 63 is connected to an air cleaner 64 disposed on the rear side relative to the carburetor 63 and on the left side of the rear wheel WR.

A luggage box 65 capable of containing a helmet and the like therein is supported between front portions of both the rear frame pipes 19 so as to be disposed on the upper side of the engine E. A rider's seat 66 covering the luggage box 65 from above is supported on a front upper portion of the luggage box 65 so that it can be opened and closed.

Figure 3:
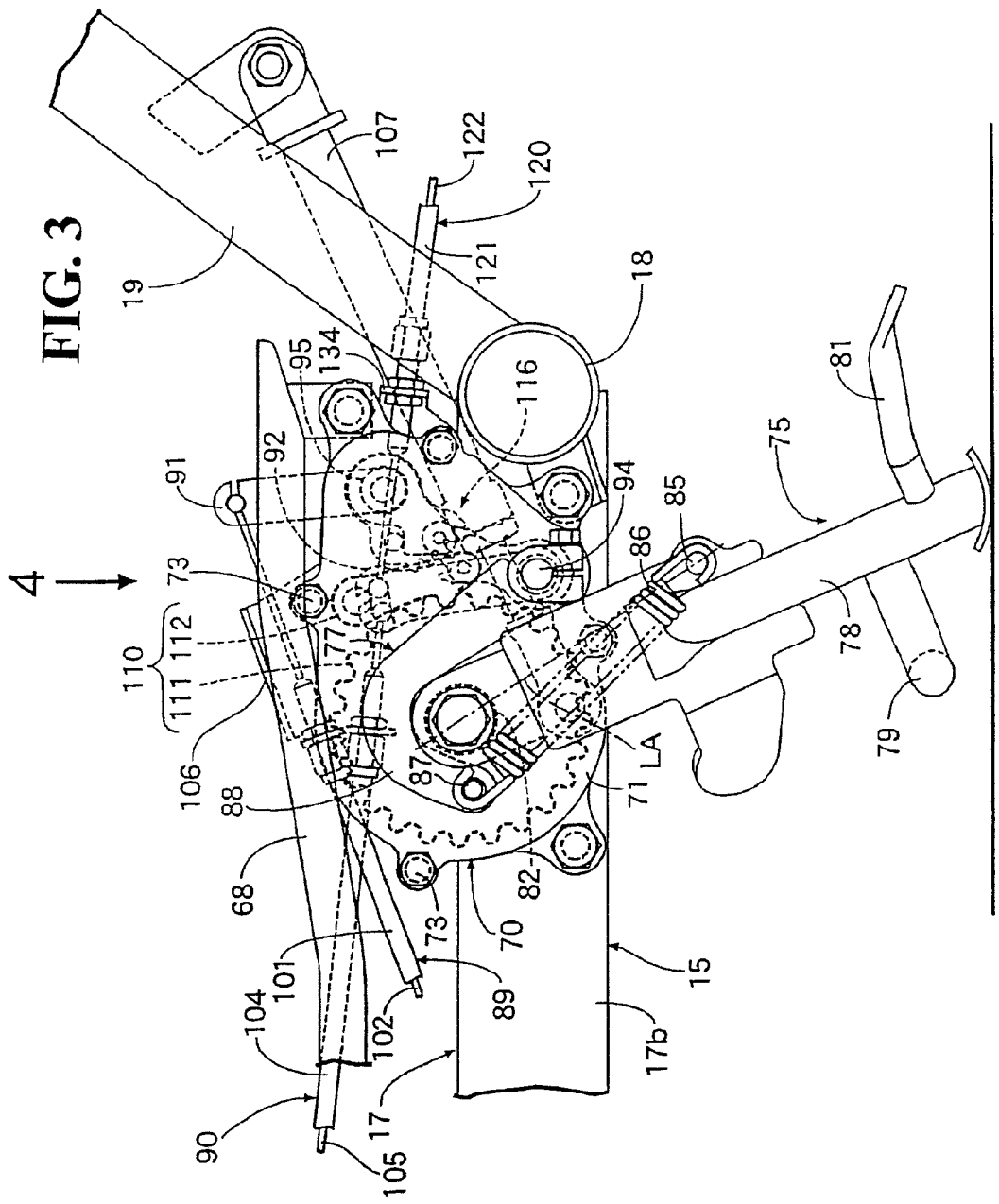
FIG. 3 is an enlarged side view of the vicinity of a stand in its erect position shown in FIG. 1.
Figure 4:
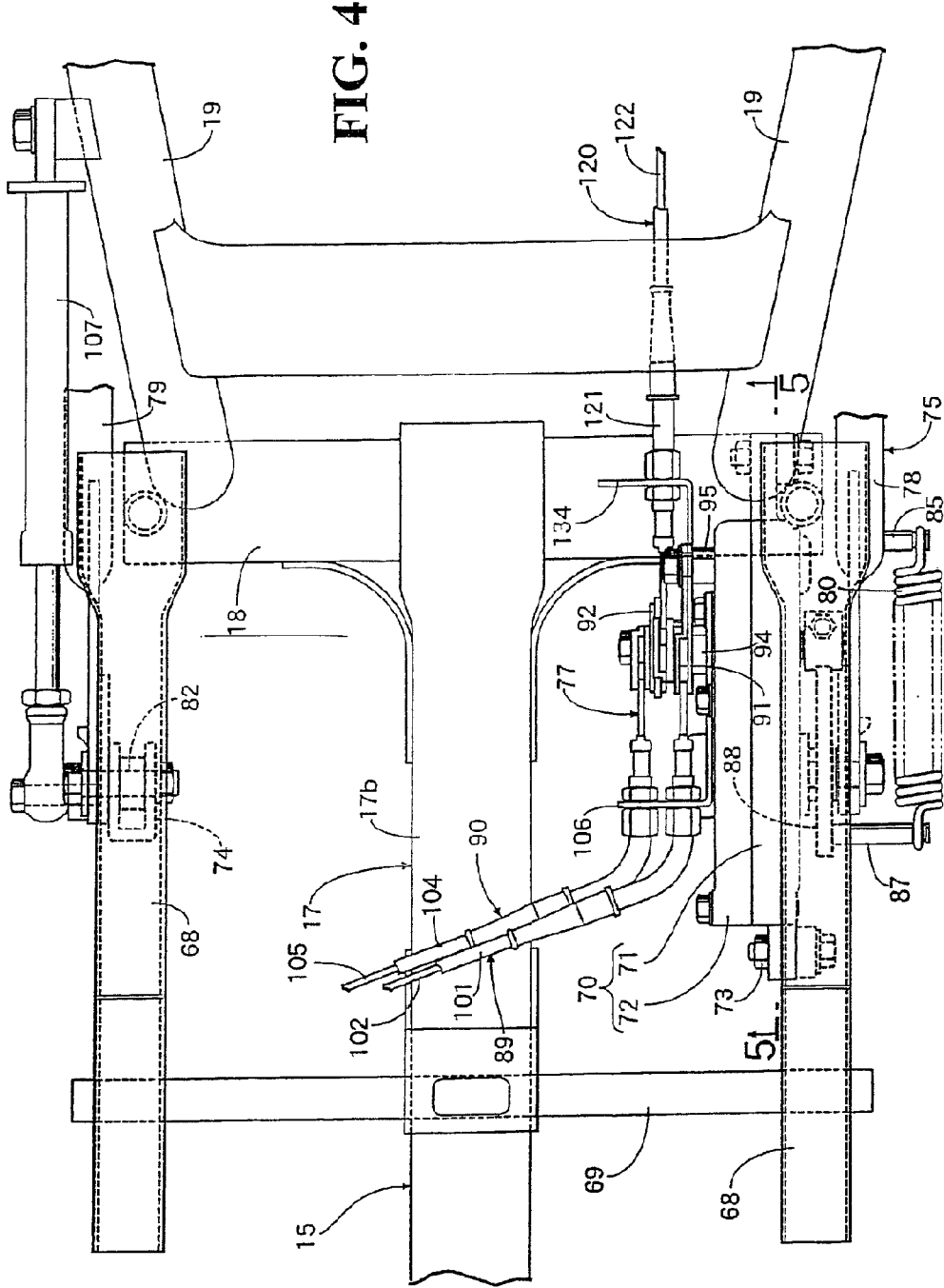
FIG. 4 is a view taken along arrow 4 of FIG. 3.

Referring to FIGS. 3 and 4 also, on the upper side on both the left and right sides of the main frame pipe 17 in the vehicle body frame 15, floor support frames 68, 68 for supporting a step floor 67 on which to place the feet of the rider on the rider's seat 66 are disposed to extend in the front-rear direction. The floor support frames 68 are supported by a support member 69 attached to the main frame 17 at an intermediate portion thereof and extending in the left-right direction.

A support case 70 is disposed on the lower side of the left floor support frame 68 of the left-right pair of floor support frames 68. The support case 70 has a configuration in which a left-right pair of case halves 71 and 72 each formed in a cup-like shape are disposed to face each other and are connected by a plurality of bolts 73. The support case 70 is attached to the cross pipe 18 of the vehicle body frame 15.

A stand 75 is rotatably mounted to the support case 70 and a bracket 74 attached to a lower portion of the right floor support frame 68 of the left-right pair of floor support frames 68. The stand 75 can be turned between a first erect position (the position shown in FIGS. 1 and 3) for obtaining a parking condition with the rear wheel WR on the ground and a stored position (the position shown in FIG. 8) for canceling the parking condition. The stand 75 can be further turned from the first erect position to the opposite side of the stored position to a second erect position (the position shown in FIG. 10) for obtaining a parking condition with the rear wheel WR slightly above the ground surface.

On the other hand, an operating lever 76 as an operating element is supported on the vehicle body frame 15 on the front side of the head pipe 16 so that it can be manually operated upward and downward from the rider's seat 66 side. An interlocking mechanism 77 turns the stand 75 according to a manual operation of the operating lever 76.

The stand 75 is composed of a left-right pair of leg portions 78 and 79. A connecting pipe 80 connects intermediate portions of the leg portions 78 and 79. A stand shaft 82 fixed to one end portion of the left leg portion 78 of both the leg portions 78 and 79 is turnably borne by the support case 70, whereas a shaft 83 fixed to one end portion of the right leg portion 79 coaxially with the stand shaft 82 is turnably borne by the bracket 74. In addition, a foot receiving portion 81 on which to put the rider's foot at the time of turning the stand 75 from the first erect position to the second erect position is projectingly provided at the other end portion of the left leg portion 78.

Figure 5:
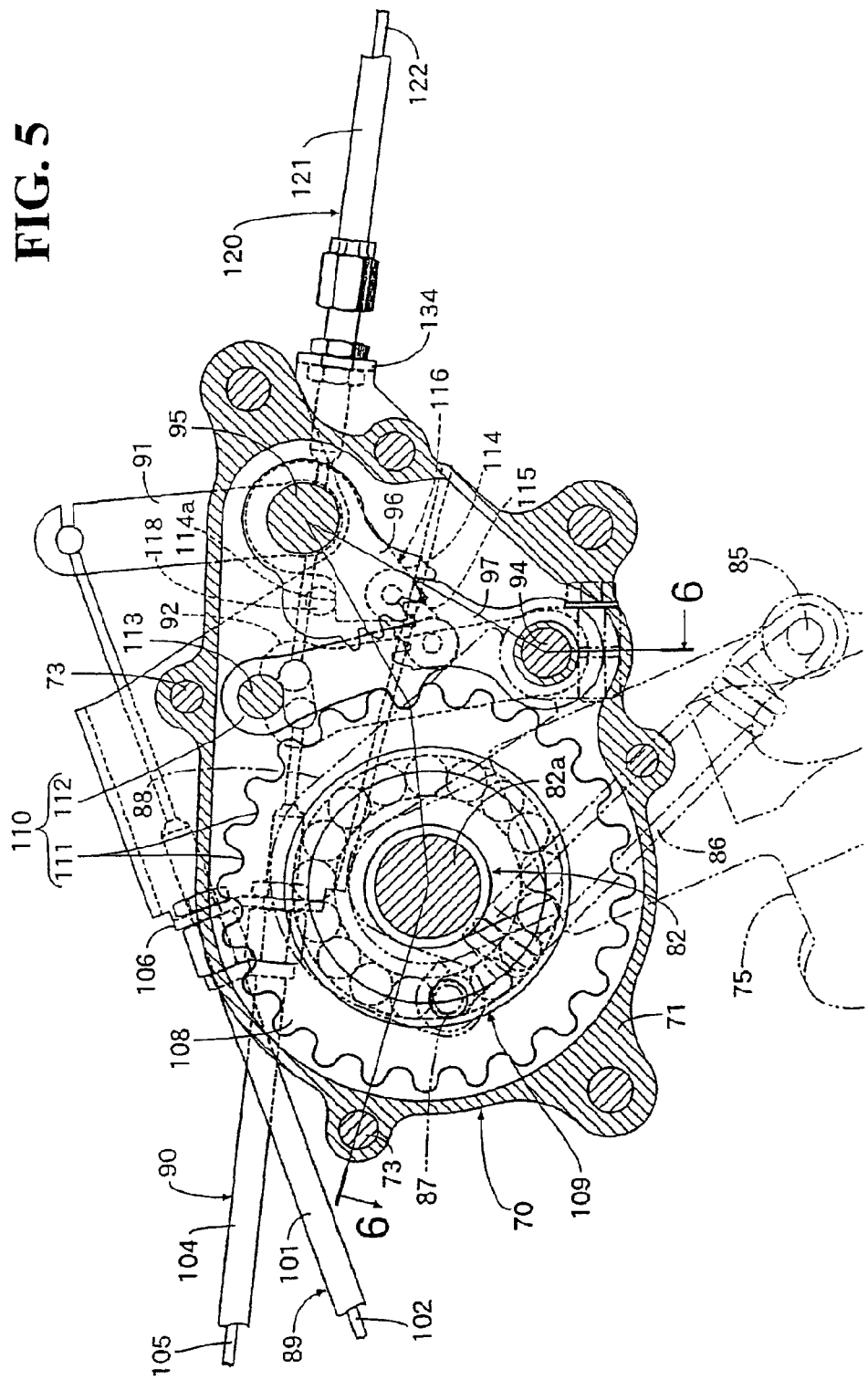
FIG. 5 is an enlarged sectional view taken along line 5-5 of FIG. 4.
Figure 6:
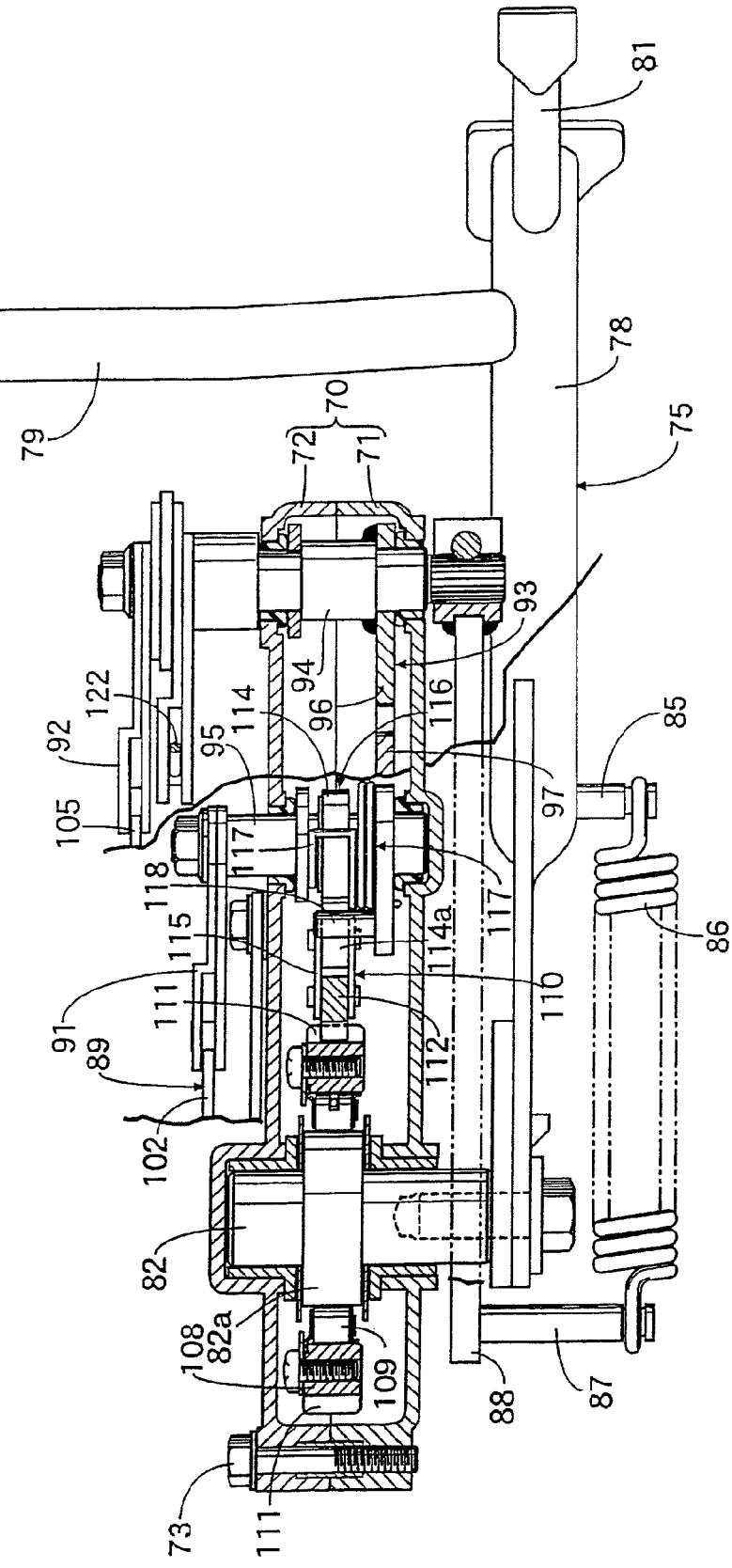
FIG. 6 is a sectional view taken along line 6-6 of FIG. 5.

Referring to FIGS. 5 and 6 also, the interlocking mechanism 77 includes a coil-formed stand spring 86 connected at its one end to a first connecting pin 85 planted in a longitudinally intermediate portion of the left leg portion 78 possessed by the stand 75; a spring support member 88 on one end side of which a second connecting pin 87 as a spring support portion for connection with the other end of the stand spring 86 is planted and the other end portion of which is borne by the support case 70; a storing operating force transmitting mechanism 89 by which a manual operating force for operating the operating lever toward a side for turning the stand 75 from the first erect position toward the stored position side is transmitted to the spring support member 88 side; an erecting operating force transmitting mechanism 90 by which a manual operating force for operating the operating lever 76 toward a side for turning the stand 75 from the stored position toward the first erect position side is transmitted to the spring support member 88 side; a first turning lever 91 turnably borne on the support case 70 and connected with the storing operating force transmitting mechanism 89; a second turning lever 92 turnably borne on the support case 70 and connected with the erecting operating force transmitting mechanism 90; and a transmission mechanism 93 provided between the other end portion of the spring support member 88 and the first turning lever 91.

The spring support member 88 is formed in an arc shape such as to surround an upper portion of the stand shaft 82, and is disposed on the left side of the support case 70. On the other hand, a first turning shaft 94 disposed on the rear lower side of the stand shaft 82 while having an axis parallel to the stand shaft 82 is turnably borne on the support case 70, and the other end portion of the spring support member 88 is fixed to a projecting end portion, projecting to the left side from the support case 70, of the first turning shaft 94.

In addition, a second turning shaft 95 disposed on the rear upper side of the first turning shaft 94 while having an axis parallel to the stand shaft 82 and the first turning shaft 94 is turnably borne on the support case 70. The first turning lever 91 and the second turning lever 92 are disposed on the right side of the support case 70. A base end portion of the first turning lever 91 is fixed to a projecting end portion, projecting to the right side from the support case 70, of the second turning shaft 95, whereas a base end portion of the second turning lever 92 is fixed to a projecting end portion, projecting to the right side from the support case 70, of the first turning shaft 94.

The transmission mechanism 93 is provided between the first and second turning shafts 94 and 95, and is contained in the support case 70. The transmission mechanism 93 is composed of a drive sector gear 96 fixed to the second turning shaft 95, and a driven sector gear 97 fixed to the first turning shaft 94 and meshed with the drive sector gear 96. Turning of the first turning lever 91 and the second turning shaft 95 is transmitted through the transmission mechanism 93 to the first turning shaft 94 and the spring support member 88. In addition, since the second turning lever 92 is fixed to the first turning shaft 94, the turning of the second turning lever 92 is transmitted directly to the spring support member 88.

Figure 7:
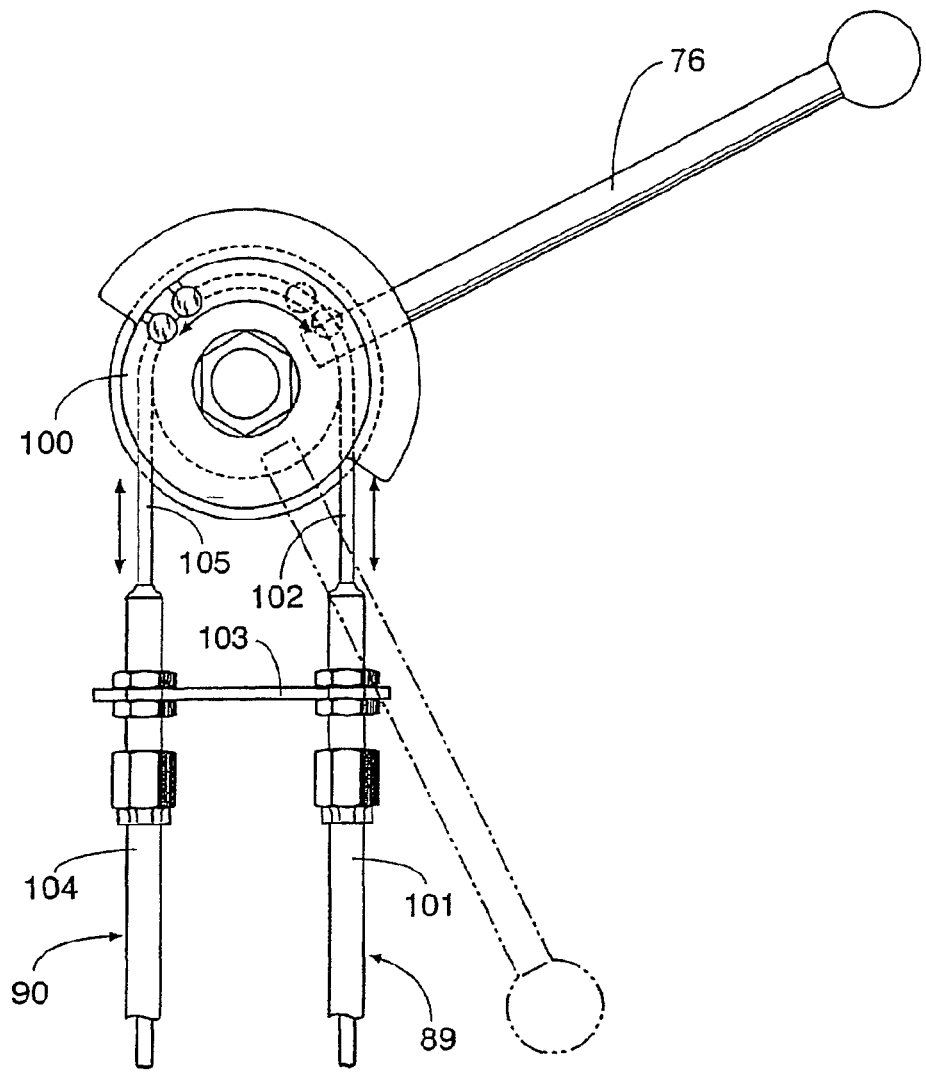
FIG. 7 is a side view of the vicinity of an operating lever.

In FIG. 7, a base end portion of the operating lever 76 is fixed to a drum 100 turnably borne on the vehicle body frame 15 on the front side of the head pipe 16. In addition, the storing operating force transmitting mechanism 89 is a cable having an inner cable 102 movably inserted in an outer cable 101. One end of the outer cable 101 is fixed to a cable support plate 103 fixed to the vehicle body frame 15 on the lower side of the drum 100. One end portion of the inner cable 102 protruding from one end of the outer cable 101 is wrapped around and connected to the drum 100 so that its amount of wrapping around the drum 100 is increased according to an operation of upwardly turning the operating lever 76 from the erecting operating position indicated by chain line in FIG. 7 to the storing operating position indicated by solid line in FIG. 7. Similarly, the erecting operating force transmitting mechanism 90 is a cable having an inner cable 105 movably inserted in an outer cable 104, and one end of the outer cable 104 is fixed to the cable support plate 103. One end portion of the inner cable 105 protruding from one end of the outer cable 104 is wrapped around and connected to the drum 100 so that its amount of wrapping around the drum 100 is increased according to an operation of downwardly turning the operating lever 76 from the storing operating position indicated by solid line in FIG. 7 to the erecting operating position indicated by chain line in FIG. 7.

On the other hand, the other end of the outer cable 101 of the storing operating force transmitting mechanism 89 is fixed to a cable support plate 106 fixed to the case half 72 of the support case 70, and the other end of the inner cable 102 protruding from the other end of the outer cable 101 is connected to the first turning lever 91. In addition, the other end of the outer cable 104 of the erecting operating force transmitting mechanism 90 is also fixed to the cable support plate 106, and the other end of the inner cable 105 protruding from the other end of the outer cable 104 is connected to the second turning lever 92.

Therefore, attendant on an operation of turning the operating lever 76 downwards from the storing operating position to the erecting operating position, the second turning lever 92 is turned counterclockwise in FIGS. 3 and 5, whereby a clockwise turning force is transmitted to the first turning shaft 94 and the spring support member 88. In addition, attendant on an operation of turning the operating lever 76 upwards from the erecting operating position to the storing operating position, the first lever 91 is turned counterclockwise in FIGS. 3 and 5, whereby a clockwise turning force is transmitted from the second turning shaft 95 to the first turning shaft 94 and the spring support member 88 through the transmission mechanism 33.

When the operating lever 76 is turned toward the erecting operating position side, as shown in FIGS. 3 and 5, the second connecting pin 87 of the spring support member 88 is located on the front side of the straight line LA connecting the center of the stand shaft 82 and the center of the first connecting pin 85. In this condition, the stand spring 86 displays a spring force for urging the stand 75 toward the erect position side. In addition, when the operating lever 76 is turned toward the storing operating position side, as shown in FIGS. 8 and 9, the second connecting pin 87 of the spring support member 88 is located on the upper side of the straight line LA connecting the center of the stand shaft 82 and the center of the first connecting pin 85, and, in this condition, the stand spring 86 displays a spring force for urging the stand 75 toward the stored position side.

Figure 8:
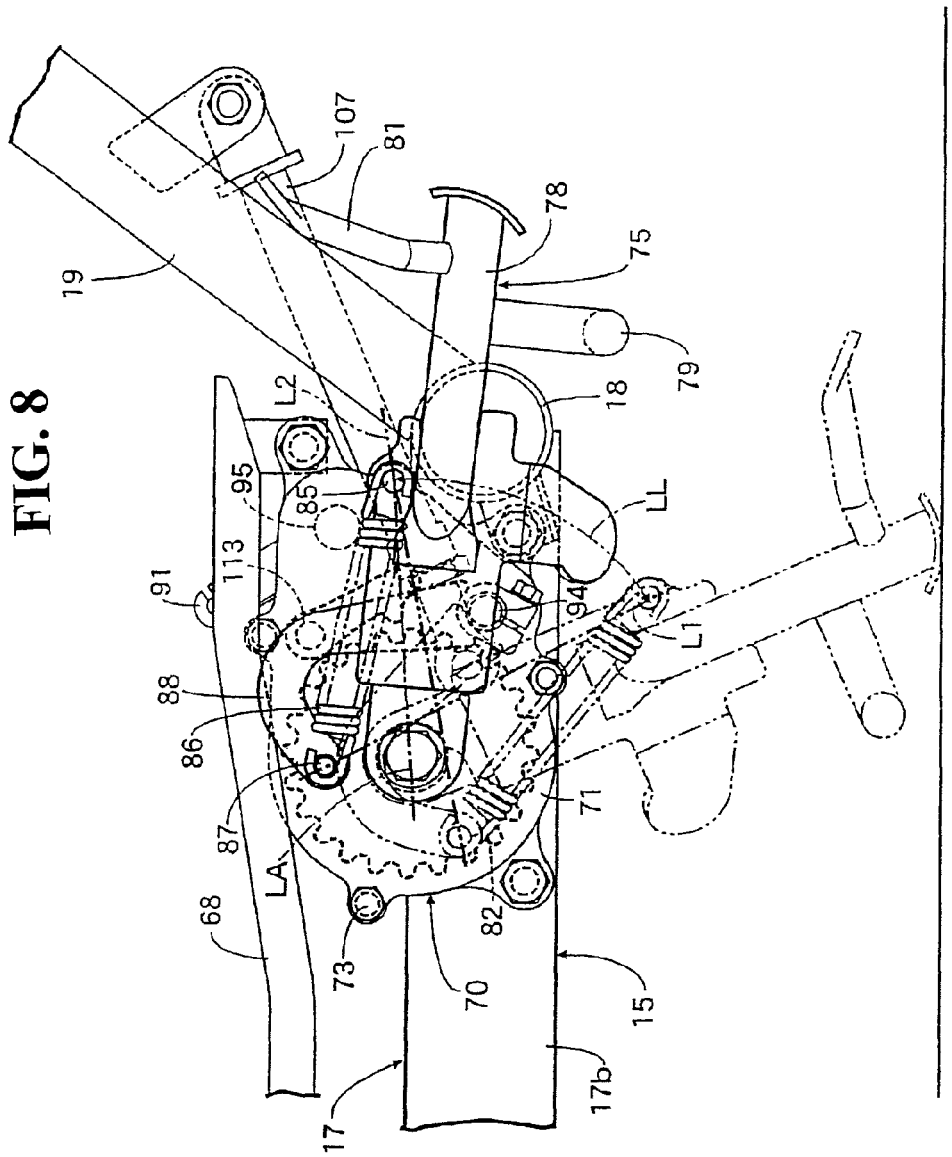
FIG. 8 is a side view corresponding to FIG. 3, showing the condition where the stand is in its stored position.
Figure 9:
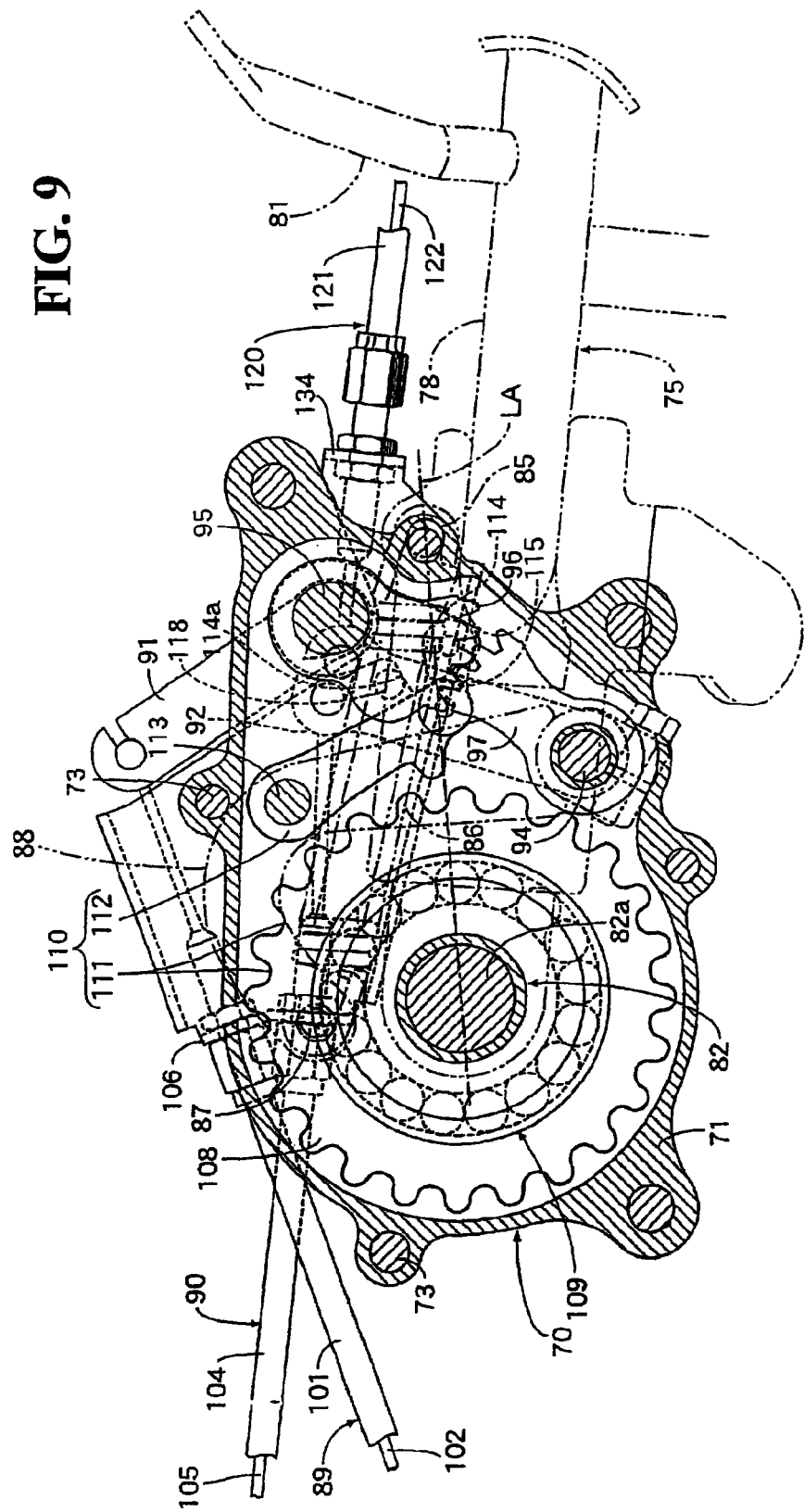
FIG. 9 is a sectional view corresponding to FIG. 5, showing the condition where the stand is in its stored position.

As shown in FIG. 8, the center of turning of the spring support member 88, i.e., the center of the first turning shaft 94 is disposed in the region surrounded by the locus LL along which the center of the first connecting pin 85 as the point of connection of one end of the stand spring 86 to the stand 75 is moved according to the turning of the stand 75, the straight line L1 connecting the center of the first connecting pin 85 at the time when the stand 75 is in the first erect position and the center of the second connecting pin 87 at the time when the stand 75 is in the stored position, and the straight line L2 connecting the center of the first connecting pin 85 at the time when the stand 75 is in the stored position and the center of the second connecting pin 87 at the time when the stand 75 is in the erect position. Desirably, the first turning shaft 94 is located in the vicinity of the center of the region.

According such a layout, a time difference can be set between the time when an operation of the operating lever 76 is completed and the time when turning of the stand 75 is started. This ensures that the stand 75 would not be turned unless the operation completed condition of the operating lever 76 is maintained for a period corresponding to the time difference. Accordingly, the operator's will to make an operation can be reflected better, and the stand 75 can be restrained from being turned against the operator's will.

In addition, a shock absorber 107 is provided between the right leg portion 79 of the stand 75 and the right rear frame pipe 19 in the vehicle body frame 15.

The stand shaft 82 in the support case 70 is provided with a large diameter portion 82a, and a one-way clutch 109 having an outer ring 108 is mounted onto the large diameter portion 82a. The one-way clutch 109 inhibits the stand shaft 82 and the stand 75 from being turned toward the stored position side, since the outer ring 108 is inhibited from being rotated, in the condition where the stand 75 is in the first erect position, but the one-way clutch 109 permits the stand shaft 82 and the stand 75 to be turned from the first erect position toward the second erect position side. The changeover between the condition where the rotation of the outer ring 108 is inhibited and the condition where the rotation of the outer ring 108 is permitted is controlled by a clutch operation control mechanism 110.

The clutch operation control mechanism 110 includes a plurality of lock tooth portions 111, 111 provided at regular intervals on the outer circumference of the outer ring 108, and an engaging pawl 112 capable of operating between a position for selective engagement with one of the lock tooth portions 111 and a position for disengagement. The engaging pawl 112 is turnably borne on the case half 72 of the support case 70 through a support shaft 113.

The second turning shaft 95 is connected to the engaging pawl 112 through a lost motion mechanism 116. The lost motion mechanism 116 is composed of a turning member 114 relatively turnably mounted onto the second turning shaft 95 at a position adjacent to the driven sector gear 97, a connecting link 115 connecting the turning member 114 with the engaging pawl 112, and a torsion spring 117 surrounding the second turning shaft 95 and engaged with the second turning shaft 95 and the turning member 114 respectively at both ends thereof.

In addition, a pin 118 protruding to the turning member 114 side is planted in the driven sector gear 97, and the turning member 114 is provided with an abutting portion 114a abutting on the pin 118 from the counterclockwise direction in FIGS. 5 and 9 around an axis of the second turning shaft 95.

When the operating lever 76 is turned to the erecting operating position side and the first turning shaft 94 is turned counterclockwise in FIGS. 3 and 5, as shown in FIG. 5 the second turning shaft 95 and the driven sector gear 97 are turned counterclockwise in FIG. 5, the turning of the second turning shaft 95 is transmitted through the torsion spring 117 to the turning member 114, and the engaging pawl 112 is engaged with one of the lock tooth portions 111 on the outer circumference of the outer ring 108 possessed by the one-way clutch 109, whereby rotation of the outer ring 108 is inhibited. In addition, when the operating lever 76 is turned to the stored position side and the second turning shaft 95 is turned counterclockwise in FIGS. 8 and 9, the pin 108 of the driven sector gear 97 abuts on the abutting portion 114a of the turning member 114, turning the turning member 114 counterclockwise in FIG. 9, as shown in FIG. 9, whereby the engagement of the engaging pawl 112 with one of the lock tooth portions 111 on the outer circumference of the outer ring 108 is canceled, and rotation of the outer ring 108 is permitted.

Figure 10:
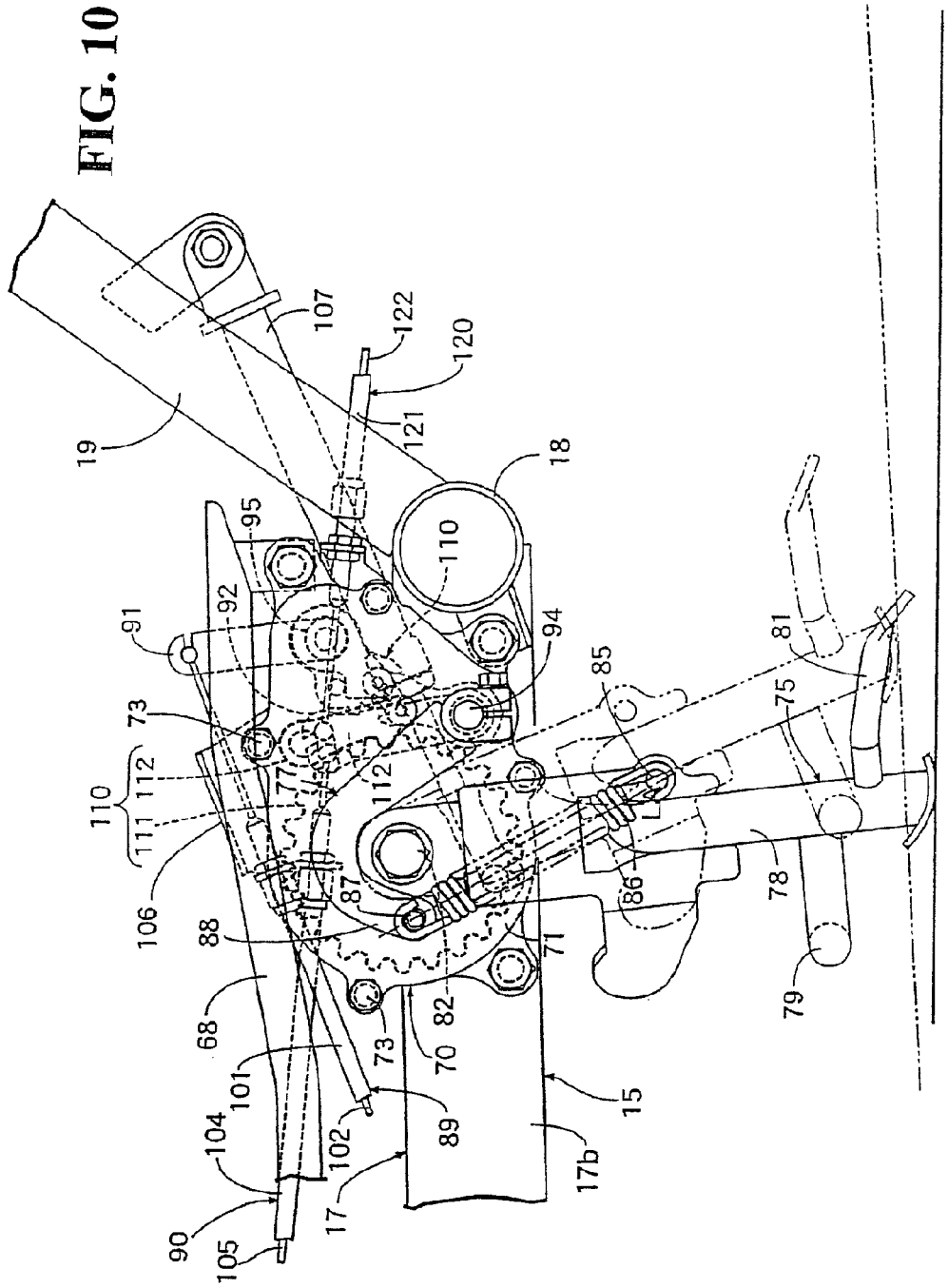
FIG. 10 is a side view corresponding to FIG. 3, showing the condition where the stand is in a second erect position.

The one-way clutch 109 inhibits the turning of the stand shaft 82 from the first erect position toward the stored position side but permits the turning of the stand shaft 82 from the first erect position toward the opposite side of the stored position, in the condition where the stand 75 is in the first erect position and rotation of the outer ring 108 is inhibited. When a force toward the rear upper side of the vehicle body is exerted in the condition with the operator's foot put on the foot receiving portion 81 of the stand 75 being in the first erect position, the stand 75 is turned to the second erect position, as shown in FIG. 10, and in this condition the rear wheel WR is being slightly above the ground surface.

Figure 11:
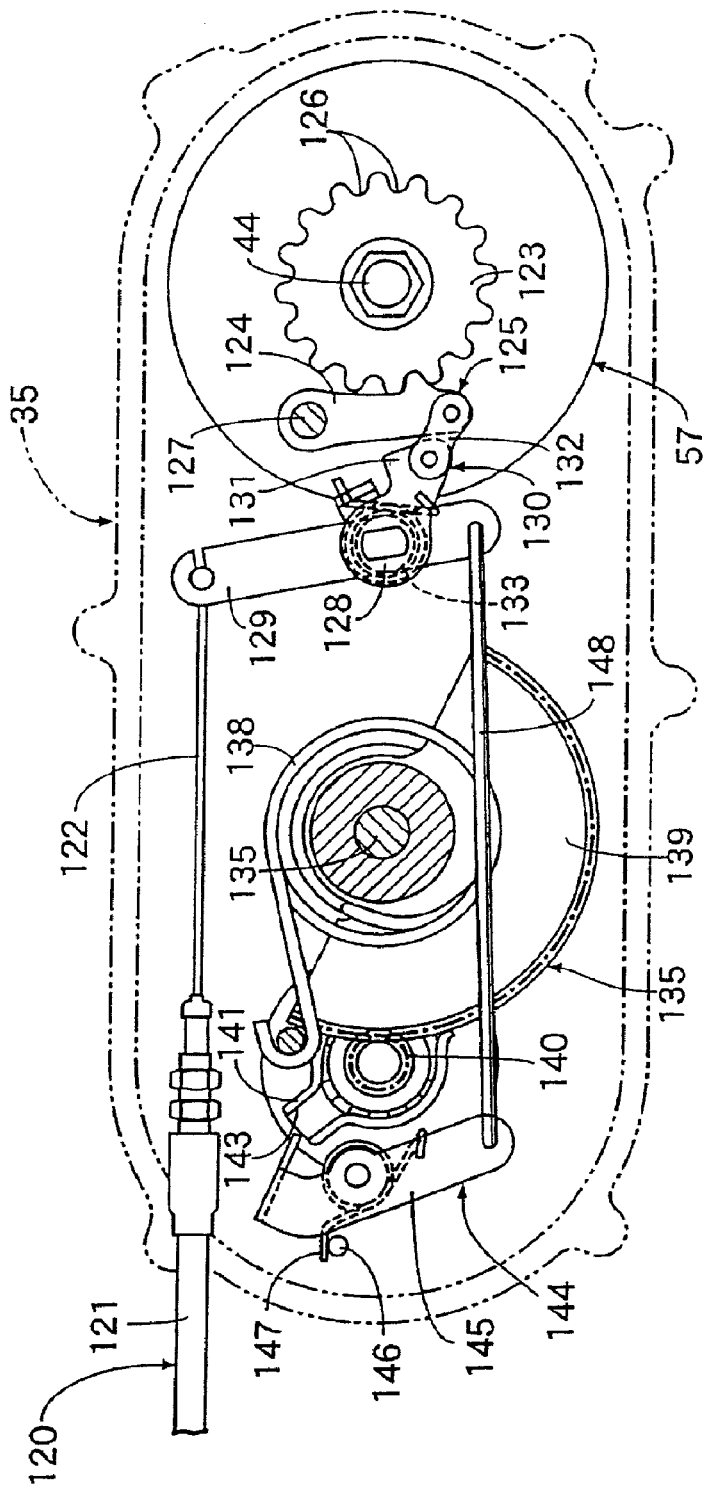
FIG. 11 is a view taken along line 11-11 of FIG. 2, showing a kick starter, a rear wheel lock mechanism and a kick start disabling mechanism in the condition where the stand is in its stored position.

In FIG. 11, a rear wheel lock mechanism 125 having a rotating member 123 interlocked and connected to the rear wheel WR and an engaging member 124 capable of being changed over between a lock condition for engaging with the rotating member 123 to thereby inhibit the rotation of the rear wheel WR and an unlock condition for disengagement from the rotating member 123 is contained in the transmission case 35. The engaging member 124 is interlocked and connected to the second turning lever 92, which constitutes a part of the interlocking mechanism 77.

The rotating member 123 is disposed between the centrifugal clutch 57 and the outside case 39, and is fixed to the output shaft 44 interlocked and connected to the axle 33 of the rear wheel WR through the speed reduction gear train 34. The rotating member 123 is provided at its outer circumference with a plurality of lock tooth portions 126 capable of selective engagement with the engaging member 124. In addition, the engaging member 124 is turnably borne on the outside case 39 through a support shaft 127 having an axis parallel to the output shaft 44.

In addition, a third turning shaft 128 having an axis parallel to the output shaft 44 and the support shaft 127 is turnably borne on the outside case 39, and an intermediate portion of a third turning lever 129 is fixed to the third turning shaft 128.

The third turning shaft 128 is connected to the engaging member 124 through a lost motion mechanism 130. The lost motion mechanism 130 is composed of a turning member 131 relatively turnably mounted onto the third turning shaft 128, a connecting link 132 connecting the turning member 131 with the engaging member 124, and a torsion spring 133 surrounding the third turning shaft 128 and engaged with the third turning shaft and the turning member 131 respectively at both ends thereof.

On the other hand, one end of the third turning lever 129 is connected, through a connecting cable 120, to the second turning lever 92 constituting a part of the interlocking mechanism 77. The connecting cable 120 has an inner cable 122 movably inserted in an outer cable 121. One end of the outer cable 121 is fixed to a cable support plate 134 attached to the support case 70, and on end of the inner cable 122 protruding from the one end of the outer cable 121 is connected to the second turning lever 92, from the opposite side of the erecting operating force transmitting mechanism 90. In addition, the other end of the outer cable 121 is fixed to the transmission case 35, and the other end of the inner cable 122 protruding from the other end of the outer cable 121 and introduced into the transmission case 35 is connected to one end of the third turning lever 129.

Figure 12:
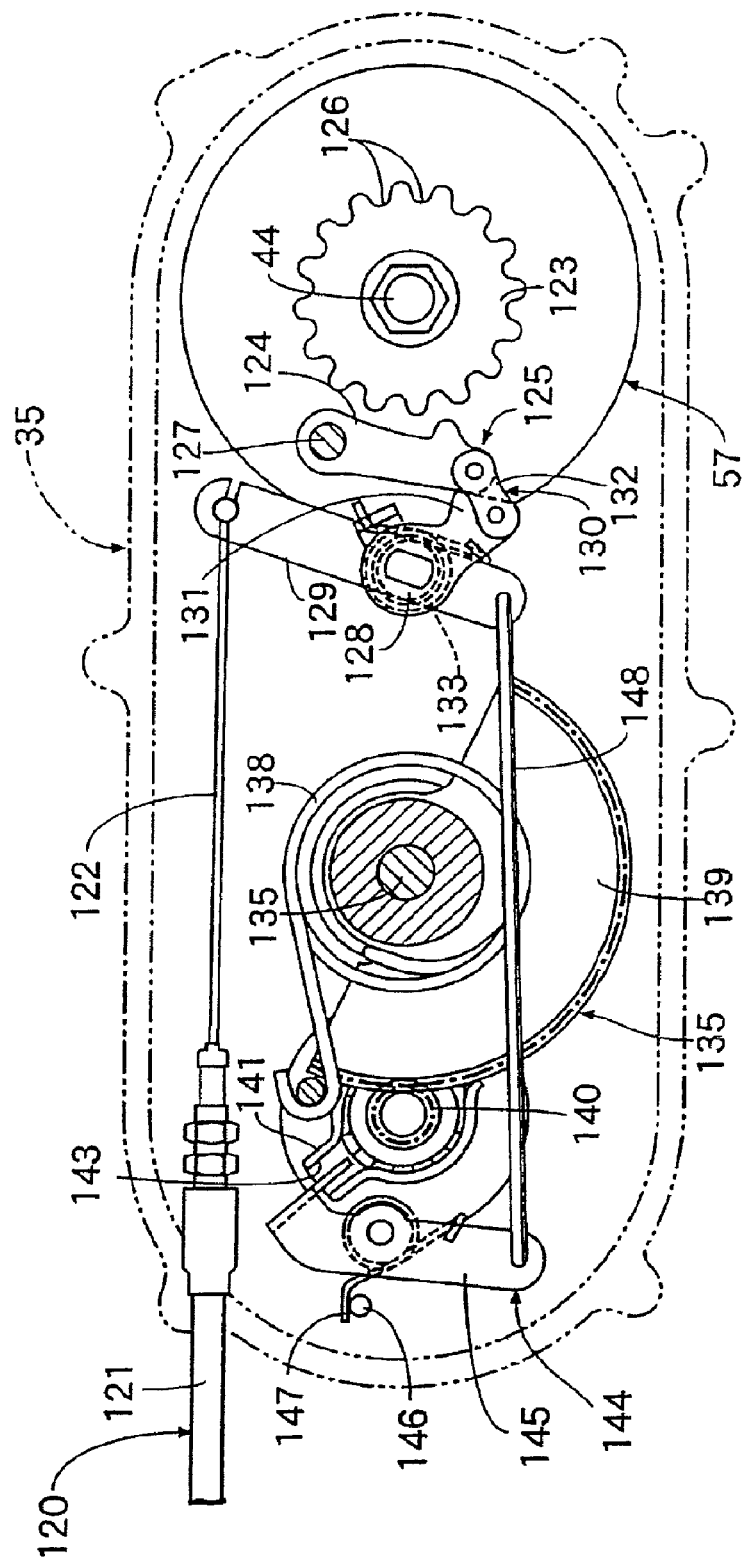
FIG. 12 is a view corresponding to FIG. 11, showing the condition where the stand is in its erect position.

When the operating lever 76 is turned to the erecting position side, as shown in FIG. 11 the third turning lever 129 is turned counterclockwise, the turning of the third turning shaft 128 is transmitted through the torsion spring 133 to the turning member 131, and the engaging member 124 is engaged with one of the lock tooth portions 126 at the outer circumference of the rotating member 123, thereby inhibiting the rotation of the rotating member 123, i.e., the rotation of the rear wheel WR. In addition, when the operating lever 76 is turned to the stored position side, as shown in FIG. 12 the third turning lever 129 is turned clockwise, and the engaging member 124 is disengaged from the one of the lock tooth portions 126 at the outer circumference of the rotating member 123, thereby permitting the rotation of the rotating member 123, i.e., the rotation of the rear wheel WR.

Meanwhile, the motor scooter type motorcycle is equipped with a kick starter 135. The kick starter 135 includes: a kick shaft 136 rotatably borne on the outside case 39 of the transmission case 35; a kick pedal 137 fixed to an end portion of the kick shaft 136 protruding from the outside case 39; a spring 138 provided between the kick shaft 136 and the outside case 39; a worm wheel 139 fixed to the inner end of the kick shaft 136; a worm gear 140 meshed with the worm wheel 139 and movable in an axial direction parallel to the kick shaft 136; a connecting member 141 fixed to the worm gear 140; and an engageable member 142 fixed to the crankshaft 26 so as to face to the connecting member 141. Upon an operation of treading the kick pedal 137, the connecting member 141 is moved forth to such a position as to be engaged with engageable member 142 and is rotated, whereby rotating power for starting is transmitted to the crankshaft 26.

The starting of the engine E by the kick starter 135 is disabled by a kick start disabling mechanism 144 in the unlocked condition of the rear wheel lock mechanism 125, and the kick start disabling mechanism 144 is interlocked and connected to the rear wheel mechanism 125.

The kick start disabling mechanism 144 includes: an engaging lever member 145 turnably borne on the outside case 39 through a shaft 146 so that it can be changed over between the state of being engaged with a lock groove 143 provided in the connecting member 141 so as to inhibit the rotation of the connecting member 141 and the state of being disengaged from the lock groove 143 so as to permit the rotation of the connecting member 141; a torsion spring 147 provided between the engaging lever member 145 and the outside case 39 so as to display a spring force in the direction for engaging the engaging lever member 145 with the lock groove 143; and a connecting rod 148 connecting the other ends of the engaging lever member 145 and the third turning lever 129 so as to restrict the turning position of the engaging lever member 145.

According to such a kick start disabling mechanism 144, when the operating lever 76 is turned to the erect position side, as shown in FIG. 11, the third lever 129 is turned counterclockwise, attended by turning of the engaging lever member 145 to such a position as to be disengaged from the lock groove 143, resulting in that the engine E can be started by the kick starter 135. On the other hand, when the operating lever 76 is turned to the stored position side, as shown in FIG. 12, the third turning shaft lever 129 is turned clockwise, attended by turning of the engaging lever member 145 to such a position as to be engaged with the lock groove 143, resulting in that the starting of the engine E by the kick starter 135 is disabled.

The operation of the first embodiment will now be described below. When the operating lever 76 which can be manually operated is turned toward the erect position side, the stand 75 is turned from the stored position to the first erect position through the function of the interlocking mechanism 77. The interlocking mechanism 77 has: the coil-formed stand spring 86 connected at its one end to the stand 75 turnably borne on the support case 70 attached to the vehicle body frame 15; and the spring support member 88 provided on one end side thereof with the second connecting pin 87 for engagement with the other end of the stand spring 86 and interlocked and connected to the operating lever 76 so that the position of the second connecting pin 87 can be changed according to manual operations of the operating lever 76. The other end portion of the spring support member 88 is turnably borne on the support case 70, and the position of the second connecting pin 87 determined according to an operation of the operating lever 76 to the erect position side is so set that the stand spring 86 is put in the state of urging the stand 75 toward the erect position side.

Therefore, the stand 75 can be turned from the stored position to the erect position by utilizing the spring force of the stand spring 86, and only a small operating force is needed to operate the spring support member 88 so as to change the position of the second connecting pin 87, so that it is possible to turn the stand 75 to the erect position side while suppressing the operating load to a low level.

In addition, the interlocking mechanism 77 includes: the erecting operating force transmitting mechanism 90 by which a manual operating force for operating the operating lever 76 toward the side for turning the stand 75 from the stored position to the erect position side is transmitted to the spring support member 88 side; and the storing operating force transmitting mechanism 89 by which a manual operating force for operating the operating lever 76 toward the side for turning the stand 75 from the erect position to the stored position side is transmitted to the spring support member 88 side. The position of the second connecting pin 87 determined according to an operation of the operating lever 76 to the stored position side is so set that the stand spring 86 is put in the state of urging the stand 75 toward the stored position side.

Therefore, with the simple configuration obtained by only adding the erecting operating force transmitting mechanism 90 and the storing operating force transmitting mechanism 89, it is possible to turn the stand 75 from the stored position to the erect position side, and from the erect position to the stored position side, according to a manual operation of the operating lever 76, while suppressing the operating load to a low level.

In addition, the interlocking mechanism 77 has the second turning lever 91 turned about an axis parallel to the axis of turning of the spring support member 88 according to the manual operation of operating the operating lever 76 toward the stored position side, and the transmission mechanism 93 for transmitting the turning force of the first turning lever 91 to the spring support member 88 is provided between the other end portion of the spring support member 88 and the first turning lever 91, so that it is possible to enhance the degree of freedom in laying out the first turning lever 91 constituting a part of the interlocking mechanism 77. When the transmission mechanism 93 provided between the other end portion of the spring support member 88 and the first turning lever 91 is provided with an accelerating or decelerating function, the operation adjustment width of the stand is enhanced, and the degree of freedom in designing can be enhanced.

Since the shock absorber 107 is provided between the stand 75 and the vehicle body frame 15, the operation of turning the stand 75 by the stand spring 86 is made to proceed gradually, and a reduction of noise can be contrived.

Meanwhile, the center of turning of the spring support member 88, i.e., the first turning shaft 94, is disposed in the region surrounded by the locus LL along which the point of connection of one end of the stand spring 86 to the stand 75 is moved according to the turning of the stand 75, the straight line L1 connecting the point of connection of the one end of the stand spring 86 to the stand 75 at the time when the stand 75 is in the erect position and the center of the second connecting pin 87 at the time when the stand 75 is in the stored position, and the straight line L2 connecting the point of connection of the one end of the stand spring 86 to the stand 75 at the time when the stand 75 is in the stored position and the center of the second connecting pin 87 at the time when the stand 75 is in the erect position. This makes it possible to set a time difference between the time when an operation of the operating lever 76 is completed and the time when turning of the stand 75 is started, whereby it is ensured that the stand 75 would not be turned unless the condition where an operation of the operating lever 76 is completed is maintained for a period corresponding to the time difference. Therefore, the operator's will to make an operation can be reflected better, and the stand 75 can be restrained from being turned against the operator's will.

In addition, the one-way clutch 109 having the outer ring 108 is mounted to the stand shaft 82 fixed to the stand 75 and turnably borne by the support case 70, and rotation of the outer ring 108 is inhibited by the clutch operation control mechanism 110 under the condition where the stand 75 is in the first erect position. The one-way clutch 109 has a configuration in which rotation of the outer ring 108 is inhibited by the clutch operation control mechanism 110 under the condition where the stand 75 is in the first erect position, whereby turning of the stand 75 toward the stored position side is inhibited. Therefore, with the simple configuration using the one-way clutch 109 and the clutch operation control mechanism 110, the stand 75 turned to the first erect position side is prevented in a non-stage manner from being turned toward the stored position side, and an assured anti-rotation effect can be obtained. Accordingly, it is possible not only to achieve parking in the condition where the front wheel WR and the rear wheel WR are grounded but also to maintain an assured parking condition without being affected by variations in the air pressures in the wheels due to the rider's riding-on or getting-off movement. Since a general one-way clutch 109 is used without using any special component part, a rise in cost can be suppressed.

In addition, the clutch operation control mechanism 110 includes the plurality of lock tooth portions 111 provided at regular intervals at the outer circumference of the outer ring 108, and the engaging pawl 112 capable of being operated between the position for selective engagement with one of the lock tooth portions and the position for disengagement; thus, the clutch operation control mechanism 110 can be configured in a simple structure.

While it is difficult to grasp the position of the stand 75 at the time of turning the stand 75 by a manual operation of the operating lever 76, the use of the one-way clutch 109 capable of steplessly restricting the turning of the stand 75 toward the stored position side makes it possible to enhance the assuredness of the operation of turning the stand 75.

Furthermore, since the second turning shaft 95 constituting a part of the interlocking mechanism 77 is connected to the engaging pawl 112 through the lost motion mechanism 116, the operation of the operating lever 76 for turning the stand 75 would not be influenced by the operation of the engaging pawl 112, and both the operation of turning the stand 75 and the operation of the engaging pawl 112 can be performed assuredly.

In addition, the rear wheel lock mechanism 125 is provided which includes the rotating member 123 interlocked and connected to the rear wheel WR, and the engaging member 124 capable of being changed over between the lock condition for being engaged with the rotating member 123 to inhibit the rotation of the rear wheel WR and the unlock condition for being disengaged from the rotating member 123. The engaging member 124 is interlocked and connected to the second turning lever 92 constituting a part of the interlocking mechanism 77, and rotation of the rotating member 123 is inhibited in conjunction with the turning of the stand 75 toward the erect position side. Therefore, rotation of the rear wheel WR is inhibited when the motor scooter type motorcycle is parked with the stand 75 in the erect position, and the motor scooter type motorcycle is prevented from starting to run undesirably when the stand 75 is erected. As compared with a configuration in which a brake mechanism is operated in conjunction with turning of the stand 75, there is no possibility of an error being generated between an erecting operation of the stand 75 and a brake operation due to a reduction in the play amount in the brake mechanism or the thickness of a brake pad; thus, the operabilities of these operations are not mutually influenced, so that easy maintenance can be secured.

Since the lost motion mechanism 130 is interposed between the second turning lever 92 and the engaging member 124, the operation of the operating lever 76 for turning the stand 75 is not influenced by the operation of the engaging member 124, and both the turning operation of the stand 75 and the operation of the engaging member 124 can be performed assuredly.

In addition, there is provided the kick start disabling mechanism 144 interlocked with the rear wheel lock mechanism 125 in such a manner that the starting of the engine E by use of the kick starter 135 annexed to the engine E is disabled in the unlock state of the rear wheel lock mechanism 125, and the kick starting of the engine E is permitted only under the condition where rotation of the rear wheel WR is inhibited by the rear wheel lock mechanism 125. Therefore, the motor scooter type motorcycle is prevented from moving at the time of kick starting, and the operability in the kick starting is enhanced.

In addition, the kick starter 135 has the connecting member 141 moved in the direction of the crankshaft 26 of the engine E to be engaged with the crankshaft 26 at the time of kick starting, and the kick start disabling mechanism 144 has the engaging lever member 145 capable of being engaged with the connecting member 141 to thereby disable movement of the connecting member 141. Therefore, the kick start disabling mechanism 144 can be configured in a compact form by adopting the simple structure in which the engaging lever member 145 is only engaged with the connecting member 141 of the kick starter 135.

Furthermore, since the rear wheel lock mechanism 125 is contained in the transmission case 35 possessed by the power unit P, the power unit P inclusive of the rear wheel lock mechanism 125 can be configured in a compact form.

Figure 13:
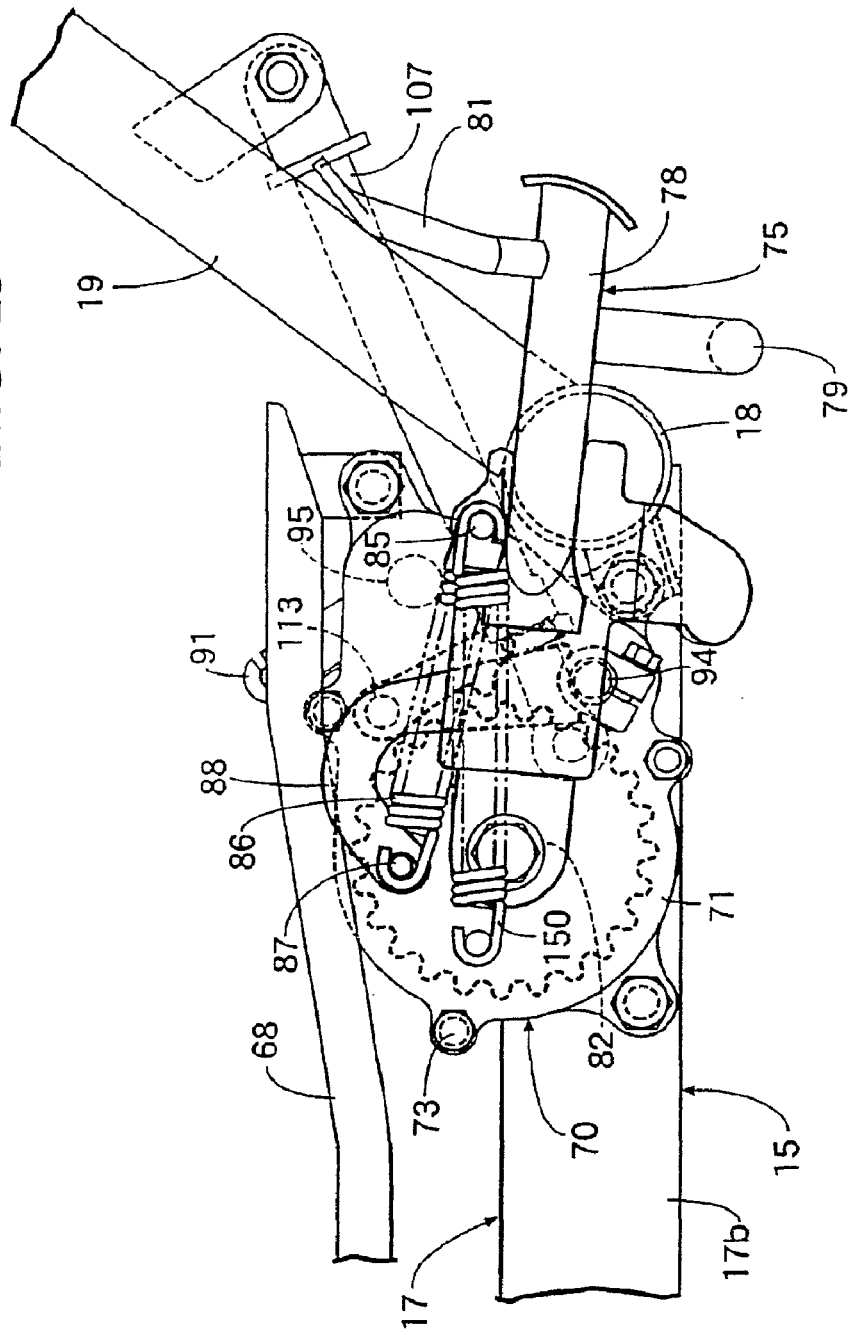
FIG. 13 is a side view, corresponding to FIG. 9, of a second embodiment of the present invention.

FIG. 13 shows a second embodiment of the present invention, in which an auxiliary coil spring 150 changed over, according to the turning of the stand 75, between the state of urging the stand 75 toward the first and second erect position sides and the state of urging the stand 75 toward the stored position side is provided between the stand 75 and the support case 70, separately from the stand spring 86.

According to the second embodiment as just-mentioned, the stand 75 is urged by the auxiliary coil spring 150 in addition to the stand spring 86, whereby the operating load can be reduced while securing a sufficient urging force for turning the stand 75.

Figure 14:
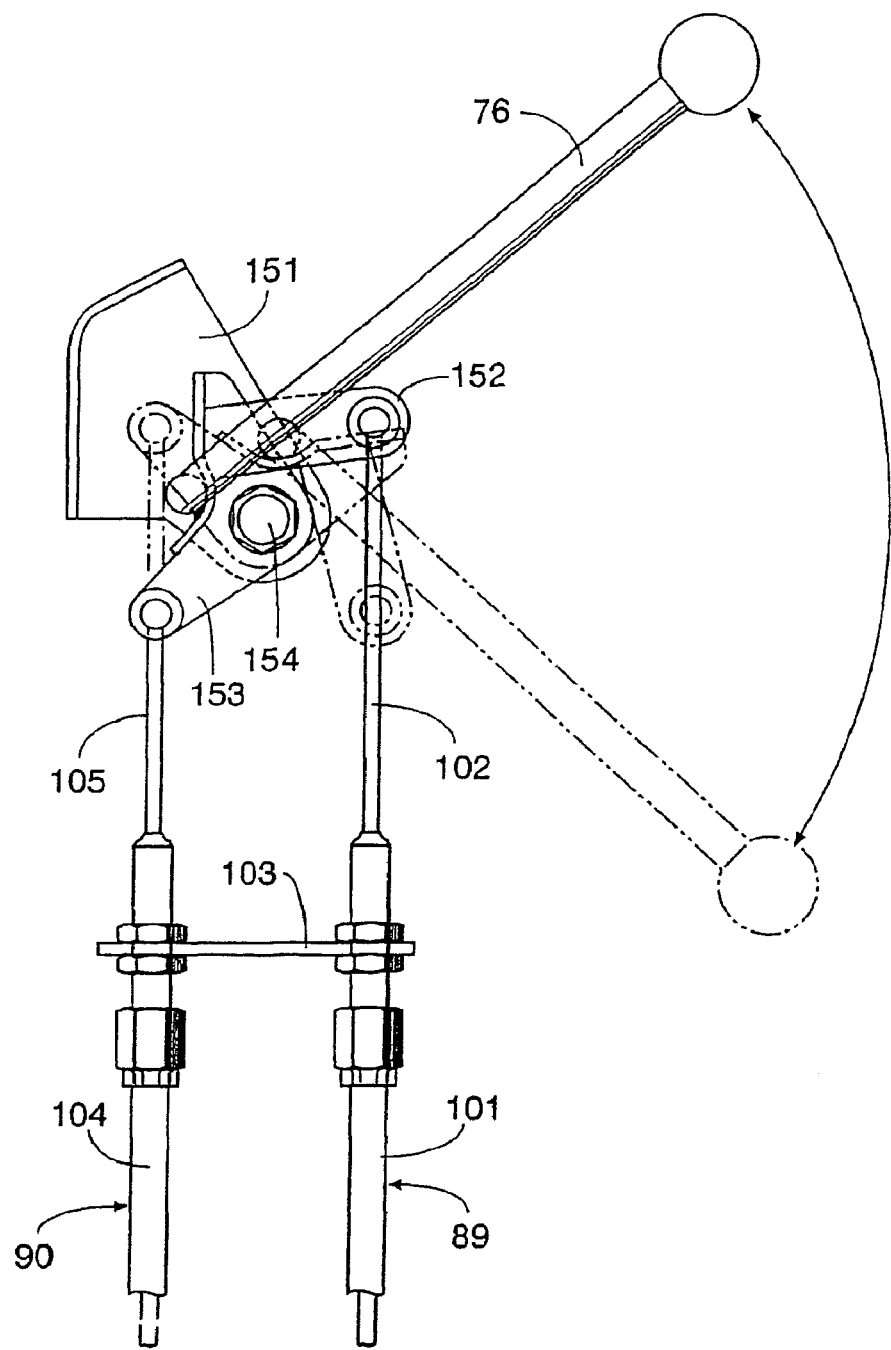
FIG. 14 is a side view, corresponding to FIG. 7, of a third embodiment of the present invention.

FIG. 14 shows a third embodiment of the present invention, in which the operating lever 76 is attached to a turning connecting member 151 turnably borne on the vehicle body frame 15 (refer to the first embodiment) through a support shaft 154, the inner cable 102 of the storing operating force transmitting mechanism 89 is connected to a first connecting arm 152 possessed by the turning connecting member 151, and the inner cable 105 of the erecting operating force transmitting mechanism 90 is connected to a second connecting arm 153 possessed by the turning connecting member 151.

According to the third embodiment, also, by an operation of turning the operating lever 76, an operating force from the operating lever 76 can be transmitted to the storing operating force transmitting mechanism 89 and the erecting operating force transmitting mechanism 90.

While some embodiments of the present invention have been described above, the present invention is not limited to the above embodiments, and various design modifications can be made within the scope of the present invention as set forth in the claims.

For example, the present invention is applicable also to two-wheeled vehicles other than the motor scooter type motorcycle shown in the drawings and to bicycles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stand device for a motorcycle, comprising:
a stand shaft attached to a stand, said stand shaft being borne on a vehicle body frame or a support body fixed to said vehicle body frame, in such a manner that said stand can be turned between an erect position for obtaining a parking condition and a stored position for canceling the parking condition;
a one-way clutch having an outer ring, said one-way clutch being mounted to said stand shaft; and a clutch operation control mechanism that is capable of inhibiting rotation of said outer ring in the condition where said stand is in the erect position, wherein said one-way clutch is mounted to said stand shaft in such a manner that in the condition where said stand is in said erect position, rotation of said outer ring is inhibited by said clutch operation control mechanism, and turning of said stand toward said stored position side is inhibited.

2. The stand device for a motorcycle as se forth in claim 1, wherein said clutch operation control mechanism comprises:

a plurality of lock tooth portions provided at regular intervals at the outer circumference of said outer ring; and an engaging pawl that is capable of operating between a position for selective engagement with one of said lock tooth portions and a position for disengagement.

3. The stand device for a motorcycle as set forth in claim 1, further comprising:

an operating element that is manually operated; and an interlocking mechanism that turns said stand according to an operation of said operating element.

4. The stand device for a motorcycle as set forth in claim 2, further comprising:

an operating element that is manually operated; and an interlocking mechanism that turns said stand according to an operation of said operating element.

5. The stand device for a motorcycle as set forth in claim 3, wherein an operating member constituting a part of said interlocking mechanism is connected to said engaging pawl through a lost motion mechanism.

6. The stand device for a motorcycle as set forth in claim 4, wherein an operating member constituting a part of said interlocking mechanism is connected to said engaging pawl through a lost motion mechanism.

* * * * *